United States Patent
Zhang et al.

(10) Patent No.: US 11,757,506 B2
(45) Date of Patent: Sep. 12, 2023

(54) BEAMFORMING MANAGEMENT IN WIRELESS NETWORKS

(71) Applicant: Apple Inc., Cupertino, CA (US)

(72) Inventors: Yushu Zhang, Beijing (CN); Yuan Zhu, Beijing (CN); Gang Xiong, Portland, OR (US); Ralf Bendlin, Portland, OR (US); Jong-Kae Fwu, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/480,049

(22) Filed: Sep. 20, 2021

(65) Prior Publication Data

US 2022/0006498 A1    Jan. 6, 2022

Related U.S. Application Data

(63) Continuation of application No. 15/747,010, filed as application No. PCT/US2015/000376 on Dec. 26, 2015, now Pat. No. 11,159,213.

(Continued)

(51) Int. Cl.
| | |
|---|---|
| H04B 7/06 | (2006.01) |
| H04B 7/0408 | (2017.01) |
| H04B 7/0456 | (2017.01) |
| H04L 5/00 | (2006.01) |
| H04W 84/04 | (2009.01) |

(52) U.S. Cl.
CPC ......... *H04B 7/0617* (2013.01); *H04B 7/0408* (2013.01); *H04B 7/0456* (2013.01); *H04B 7/063* (2013.01); *H04B 7/0626* (2013.01); *H04L 5/0051* (2013.01); *H04L 5/0057* (2013.01); *H04W 84/042* (2013.01)

(58) Field of Classification Search
CPC .. H04B 7/0617; H04B 7/0408; H04B 7/0456; H04L 5/0051; H04L 5/0057
See application file for complete search history.

(56) References Cited

U.S. PATENT DOCUMENTS

| | | |
|---|---|---|
| 9,236,016 B2 | 1/2016 | Huang |
| 9,236,916 B2 | 1/2016 | Wernersson et al. |

(Continued)

FOREIGN PATENT DOCUMENTS

| | | |
|---|---|---|
| WO | 2014157867 | 10/2014 |
| WO | 2017034509 | 3/2017 |

OTHER PUBLICATIONS

U.S. Appl. No. 15/747,010, Advisory Action, dated Apr. 21, 2020, 3 pages.

(Continued)

*Primary Examiner* — Raj Jain
(74) *Attorney, Agent, or Firm* — Kilpatrick Townsend & Stockton LLP

(57) ABSTRACT

Apparatus, systems, and methods to implement receive beamforming in communication systems are described. In one example, apparatus of an evolved Node B (eNB) comprising processing circuitry to receive, from a user equipment (UE), a beamforming reference signal received power (BRS-RP) measurement and in response to the BRS-RP measurement, configure a downlink (DL) transmit (Tx) beamforming and a receiving (Rx) beamforming process on the UE. Other examples are also disclosed and claimed.

21 Claims, 8 Drawing Sheets

Related U.S. Application Data

(60) Provisional application No. 62/210,139, filed on Aug. 26, 2015.

(56) References Cited

U.S. PATENT DOCUMENTS

| | | | |
|---|---|---|---|
| 9,515,714 | B2 | 12/2016 | Jeong et al. |
| 11,159,213 | B2* | 10/2021 | Zhang .................. H04L 5/0057 |
| 2008/0227495 | A1 | 9/2008 | Kotecha et al. |
| 2013/0286960 | A1 | 10/2013 | Li et al. |
| 2014/0146863 | A1 | 5/2014 | Seol et al. |
| 2014/0177607 | A1 | 6/2014 | Li et al. |
| 2014/0269519 | A1* | 9/2014 | Shan ..................... H04L 5/0053 370/329 |
| 2014/0341048 | A1 | 11/2014 | Sajadieh et al. |
| 2015/0208251 | A1* | 7/2015 | Lim ..................... H04B 7/0617 370/328 |
| 2015/0236828 | A1 | 8/2015 | Park et al. |
| 2015/0341091 | A1 | 11/2015 | Park et al. |
| 2015/0341092 | A1 | 11/2015 | Park et al. |
| 2015/0358060 | A1 | 12/2015 | Park et al. |
| 2016/0004451 | A1 | 1/2016 | Lakshman et al. |
| 2016/0044551 | A1 | 2/2016 | Frenger et al. |
| 2016/0072572 | A1 | 3/2016 | Kang et al. |
| 2016/0080058 | A1 | 3/2016 | Kang et al. |
| 2016/0105882 | A1* | 4/2016 | Park ..................... H04L 5/0048 370/329 |
| 2016/0156394 | A1 | 6/2016 | Kim et al. |
| 2016/0191131 | A1 | 6/2016 | Balraj et al. |
| 2016/0204921 | A1 | 7/2016 | Kim et al. |
| 2016/0373224 | A1 | 12/2016 | Kim et al. |
| 2017/0026962 | A1* | 1/2017 | Liu ....................... H04W 52/48 |
| 2017/0033916 | A1 | 2/2017 | Stirling-Gallacher et al. |
| 2017/0070276 | A1 | 3/2017 | Kim et al. |
| 2017/0311217 | A1 | 10/2017 | Jung et al. |
| 2022/0006498 | A1* | 1/2022 | Zhang .................. H04L 5/0051 |

OTHER PUBLICATIONS

U.S. Appl. No. 15/747,010, Final Office Action, dated Feb. 5, 2020, 22 pages.

U.S. Appl. No. 15/747,010, Non-Final Office Action, dated Aug. 7, 2019, 22 pages.

U.S. Appl. No. 15/747,010, Non-Final Office Action, dated Jun. 10, 2020, 9 pages.

U.S. Appl. No. 15/747,010, Notice of Allowance, dated Jun. 23, 2021, 11 pages.

U.S. Appl. No. 15/747,010, Notice of Allowance, dated Mar. 2, 2021, 11 pages.

International Patent Application No. PCT/US2015/000376, International Preliminary Report on Patentability, dated Mar. 8, 2018, 7 pages.

International Patent Application No. PCT/US2015/000376, International Search Report and Written Opinion, dated Jun. 27, 2016, 8 pages.

Taiwan Patent Application No. TW105122884, Notice of Decision to Grant, dated Mar. 31, 2021, 5 pages.

Taiwan Patent Application No. TW105122884, Office Action, dated Jul. 30, 2020, 8 pages.

* cited by examiner

BEAMFORMING MANAGEMENT IN WIRELESS NETWORKS

CROSS-REFERENCES TO RELATED APPLICATIONS

This application is a continuation of U.S. patent application Ser. No. 15/747,010, filed Jan. 23, 2018, which is a 371 U.S. National Phase of PCT International Patent Application No. PCT/US2015/000376, filed Dec. 26, 2015, which in turn claims the benefit of priority of U.S. Provisional Patent Application No. 62/210,139, filed Aug. 26, 2015, the disclosures of which are incorporated herein by reference in their entireties.

BACKGROUND OF THE INVENTION

Techniques to manage aspects of receive beamforming in communication systems may find utility, e.g., in electronic communication systems for electronic devices.

BRIEF SUMMARY OF THE INVENTION

The present disclosure generally relates to the field of electronic communication. More particularly, aspects generally relate to managing aspects of receive beamforming in communication systems.

BRIEF DESCRIPTION OF THE DRAWINGS

The detailed description is provided with reference to the accompanying figures. The use of the same reference numbers in different figures indicates similar or identical items.

Figure 1:
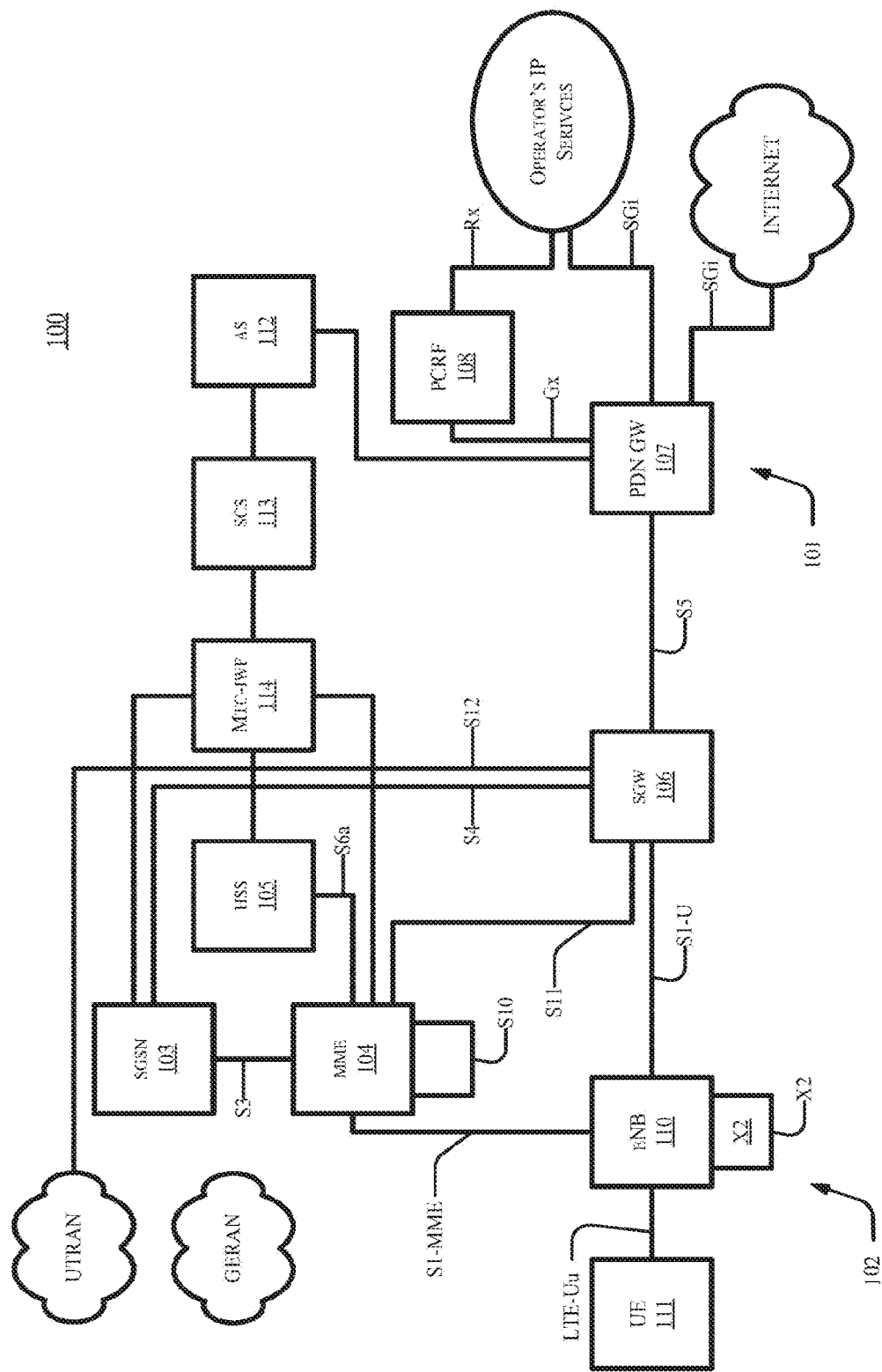
FIG. 1 is a schematic, block diagram illustration of components in a 3GPP LTE network 20 which may be used to implement techniques to manage aspects of receive beamforming in communication systems in accordance with various examples discussed herein.

It will be appreciated that for simplicity and/or clarity of illustration, elements illustrated in the figures have not necessarily been drawn to scale. For example, the dimensions of some of the elements may be exaggerated relative to other elements for clarity. Further, if considered appropriate, reference numerals have been repeated among the figures to indicate corresponding and/or analogous elements.

DETAILED DESCRIPTION OF THE INVENTION

In the following description, numerous specific details are set forth in order to provide a 20 thorough understanding of various examples. However, various examples may be practiced without the specific details. In other instances, well-known methods, procedures, components, and circuits have not been described in detail so as not to obscure the particular examples. Further, various aspects of examples may be performed using various means, such as integrated semiconductor circuits ("hardware"), computer-readable instructions organized into one or more programs ("software"), or some combination of hardware and software. For the purposes of this disclosure reference to "logic" shall mean either hardware, software, or some combination thereof.

Reference throughout this specification to "one embodiment" or "an embodiment" means that a particular feature, structure or characteristic described in connection with the embodiment is included in at least one embodiment. Thus, appearances of the phrases "in one embodiment" or "in an embodiment" in various places throughout this specification are not necessarily all referring to the same embodiment. Furthermore, the particular features, structures or characteristics may be combined in any suitable manner in one or more embodiments. Additionally, the word "exemplary" is used herein to mean "serving as an example, instance, or illustration." Any embodiment described herein as "exemplary" is not to be construed as necessarily preferred or advantageous over other embodiments.

Various operations may be described as multiple discrete operations in turn and in a manner that is most helpful in understanding the claimed subject matter. The order of description, however, should not be construed as to imply that these operations are necessarily order dependent. In particular, these operations need not be performed in the order of presentation. Operations described may be performed in a different order than the described embodiment. Various additional operations may be performed and/or described operations may be omitted in additional embodiments.

Features and characteristics of techniques to manage aspects of receive beamforming in communication systems in which the techniques may be incorporated are described below with reference to FIGS. 1-11.

FIG. 1 shows an exemplary block diagram of the overall architecture of a 3GPP LTE network 100 that includes one or more devices that are capable of implementing methods to manage aspects of receive beamforming in communication systems according to the subject matter disclosed herein. FIG. 1 also generally shows exemplary network elements and exemplary standardized interfaces. At a high level, network 100 comprises a core network (CN) 101 (also referred to as an evolved Packet System (EPC)), and an air-interface access network E UTRAN 102. CN 101 is responsible for the overall control of the various User Equipment (UE) connected to the network and establishment of the bearers. CN 101 may include functional entities, such as a home agent and/or an ANDSF server or entity, although not explicitly depicted. E UTRAN 102 is responsible for all radio-related functions.

The main exemplary logical nodes of CN 101 include, but are not limited to, a Serving GPRS Support Node 103, the Mobility Management Entity 104, a Home Subscriber Server (HSS) 105, a Serving Gate (SGW) 106, a PDN Gateway 107 and a Policy and Charging Rules Function (PCRF) Manager 108. The functionality of each of the network elements of CN 101 is well known and is not described herein. Each of the network elements of CN 101 are interconnected by well-known exemplary standardized interfaces, some of which are indicated in FIG. 1, such as interfaces S3, S4, S5, etc., although not described herein.

While CN 101 includes many logical nodes, the E UTRAN access network 102 is formed by at least one node, such as evolved NodeB (base station (BS), eNB or eNodeB) 110, which connects to one or more User Equipment (UE) 111, of which only one is depicted in FIG. 1. UE 111 is also referred to herein as a wireless device (WD) and/or a subscriber station (SS), and can include an M2M-type device. In one example, UE 111 may be coupled to eNB by an LTE-Uu interface. In one exemplary configuration, a single cell of an E UTRAN access network 102 provides one substantially localized geographical transmission point (having multiple antenna devices) that provides access to one or more UEs. In another exemplary configuration, a single cell of an E UTRAN access network 102 provides multiple geographically substantially isolated transmission points (each having one or more antenna devices) with each transmission point providing access to one or more UEs simultaneously and with the signaling bits defined for the one cell so that all UEs share the same spatial signaling dimensioning. For normal user traffic (as opposed to broadcast), there is no centralized controller in E-UTRAN; hence the E-UTRAN architecture is said to be flat. The eNBs are normally interconnected with each other by an interface known as "X2" and to the EPC by an Si interface. More specifically, an eNB is connected to MME 104 by an Si MME interface and to SGW 106 by an Si U interface. The protocols that run between the eNBs and the UEs are generally referred to as the "AS protocols." Details of the various interfaces are well known and not described herein.

The eNB 110 hosts the Physical (PHY), Medium Access Control (MAC), Radio Link Control (RLC), and Packet Data Control Protocol (PDCP) layers, which are not shown in FIG. 1, and which include the functionality of user-plane header-compression and encryption. The eNB 110 also provides Radio Resource Control (RRC) functionality corresponding to the control plane, and performs many functions including radio resource management, admission control, scheduling, enforcement of negotiated Up Link (UL) QoS, cell information broadcast, ciphering/deciphering of user and control plane data, and compression/decompression of DL/UL user plane packet headers.

The RRC layer in eNB 110 covers all functions related to the radio bearers, such as radio bearer control, radio admission control, radio mobility control, scheduling and dynamic allocation of resources to UEs in both uplink and downlink, header compression for efficient use of the radio interface, security of all data sent over the radio interface, and connectivity to the EPC. The RRC layer makes handover decisions based on neighbor cell measurements sent by UE 111, generates pages for UEs 111 over the air, broadcasts system information, controls UE measurement reporting, such as the periodicity of Channel Quality Information (CQI) reports, and allocates cell-level temporary identifiers to active UEs 111. The RRC layer also executes transfer of UE context from a source eNB to a target eNB during handover, and provides integrity protection for RRC messages. Additionally, the RRC layer is responsible for the setting up and maintenance of radio bearers.

By way of overview, in MIMO communication systems, the eNB may have several transmission (TX) beams for antenna virtualization. Similarly, the UE may have more than one receiving (RX) beams to decode the downlink signals. Different TX beams may have different best RX beams.

The eNodeB may transmit a set of beamformed reference signals (BRSs) periodically, and each BRS may use different TX beams. The UE may measure and report a signal characteristic such as the BRS Receiving Power (BRS-RP) for some or all of the BRSs transmitted from the eNB. The UE may select one or more suitable transmission beams, e.g., the best TX beam. The UE may report the suitable beam(s) to the eNB, which may then use the selected beam for transmission to the UE.

For downlink physical channels such as PDSCH and EPDCCH, some of the TX beams may be applied. Meanwhile, the Channel State Information (CSI) measurement and report may be based on a beamformed CSI Reference Signal (CSI-RS).

In some examples a UE may have two enhanced physical downlink control channel (EPDCCH) sets which utilize different TX beams. In each EPDCCH set, a parameter, y, may represent the number of control channel element (CCE) aggregation levels (AL). In some examples one TX beam may be used when y is less than or equal to 8 and two TX beams may be used if y is between 9 and 16, inclusive. In these circumstances a UE may need to detect the AL and EPDCCH set index.

For CSI-RS, two Antenna Ports (APs) may be transmitted in a TX beam, which may be considered as one CSI-RS Group (CRG). There may be a total of eight (8) CRGs in the last two symbols of one CSI-RS subframe. A UE may measure CSI for a total of 8 TX beams in a subframe. The system above may be applied in a UE which includes an omni-directional antenna. However, some UE utilize a directional antenna in which downlink receiving (RX) analog beamforming may be used for coverage and performance enhancement. In this case the UE may use different RX beams in different OFDM symbols for downlink receiving. Hence techniques to manage aspects of receive beamforming in UEs with RX beamforming may find utility.

Subject matter described herein addresses these and other issues by providing techniques to manage aspects of receive beamforming in UEs. In some examples a UE with RX beamforming may maintain a set of RX beams for downlink receiving. One RX beam in the RX beam set may be applied for each TX beam. The antenna gain may be increased if a good TX and RX beam pair is used.

A set of TX beams may be maintained in eNB which serves a UE. In some examples the TX beam index may be obtained by the BRS resource index. The mapping method between TX beam index and BRS resource index may be as indicated in EQ 1:

$$N_{beam} = \left(\frac{|k_0|}{N_{SC}^{BRS}} - 1 + b\right) \times N_{sym}^{BRS} + (|k_0| \bmod N_{sym}^{BRS}) + 1 \qquad \text{EQ 1}$$

Where $N_{beam}$ represents the number of TX beam index, $N_{SC}^{BRS}$ represents the number of subcarriers for one Beamformed Reference Signal (BRS) resource; $k_o$ represents the center subcarrier index in one BRS resource; $N_{symb}^{BRS}$ represents the number of OFDM symbols for one BRS resource. The value of b may be assigned in a binary fashion as zero (0) if $k_o$ is greater than zero (0) and one (1) if $k_o$ is not greater than zero (1).

In some examples the TX beam index 0 may be reserved to indicate omni-receiving for a UE, in which the UE may not use receiving beamforming or may use an omni-receiving beam.

Figure 2:
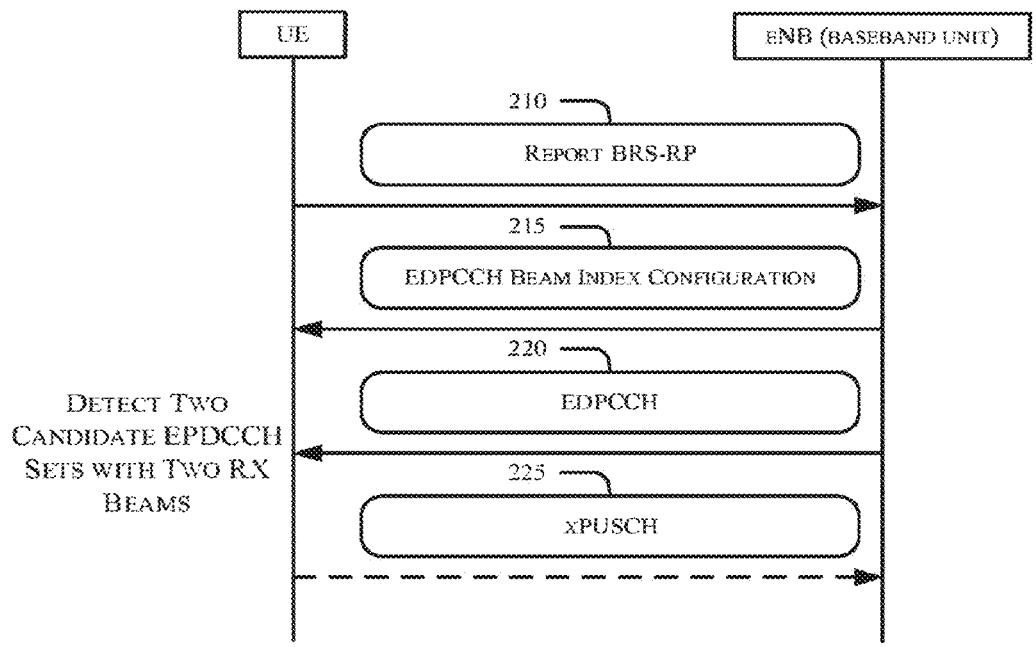
FIG. 2 is a flow diagram illustrating operations in a method to manage aspects of receive beamforming in communication systems in accordance with various examples discussed herein.
Figure 3:
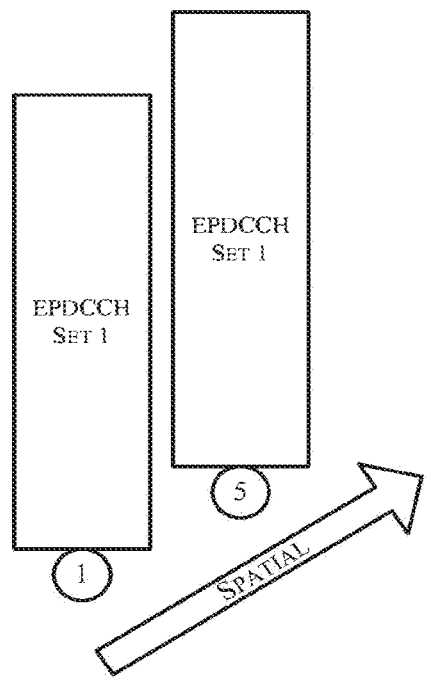
FIG. 3 is a schematic illustration of a physical downlink control channel (PDCCH) which may be used manage aspects of receive beamforming in MIMO communication systems in accordance with various examples discussed herein.

As illustrated in FIGS. 2-3, in some examples an eNB may transmit different EPDCCH sets and different CCE indexes using different TX beams. Referring to FIG. 2, at operation 210 a UE may report a BRS-RP, which may be in response to a periodic BRS or an aperiodic BRS from the eNB. The UE receives the BRS and measures one or more signal strength parameters associated with the BRS, which is reported back to the eNB at operation 210.

In some examples, the UE may transmit to the eNB the UE's various capabilities for its number of antenna panels. The number of antenna panels may be transmitted explicitly, e.g., via radio resource control (RRC) signaling or implicitly by PRACH. For example, for a UE with a number (p) antenna panels, it may transmit PRACH p times. The eNB may detect that the UE transmitted the PRACH p times and may interpret this as an indication that the UE has p antenna panels.

At operation 215 the eNB transmits an EPDCCH beam index configuration to the UE which indicates this is a possible transmission beam update point and may include an uplink (UL) grant and/or a downlink (DL) assignment. At operation 220 the eNB transmits one or more EPDCCH sets. A UE with multiple antenna panels may use different RX beams to receive the EPDCCH signals. For example, a UE which has four (4) antenna panels may use one antenna panel to detect one TX beam of EPDCCH. By contrast, if a UE has two (2) antenna panels, one antenna panel may be used to detect two TX beams of EPDCCH, which requires the two TX beams highly correlated. FIG. 3 illustrates an example for two antenna panels UE receiving, where RX beam 1 is used for receiving of EPDCCH set 1 and RX beam 5 is used for receiving of EPDCCH set 2. At operation 225 the UE may transmit an extended physical uplink shared channel (xPUSCH) to the UE.

In another example, the UE obtains the TX beams index for each of the antenna ports (APs), which may be indicated by a BRS resource index so that the UE may use the best RX beam(s) to detect the EPDCCH signals. The TX beams may be highly correlated and the TX beams index for each APs may be configured via RRC signaling or transmitted in a Random Access Response (RAR).

Figure 4:
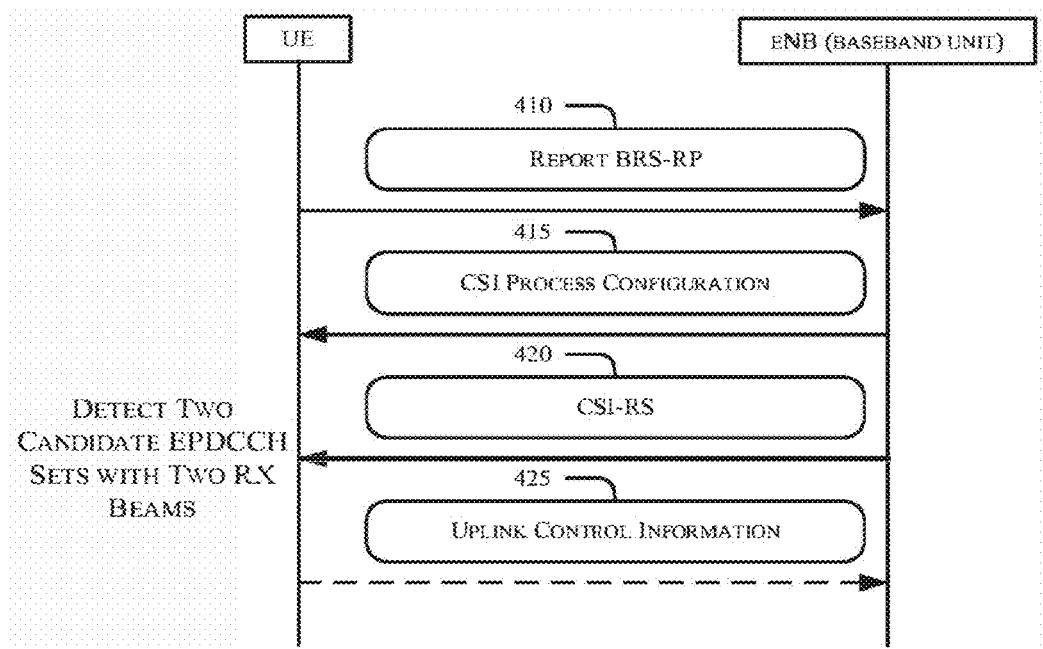
FIGS. 4-5 are diagrams illustrating channel state information (CSI) processes which may be used to implement techniques to manage aspects of receive beamforming in communication systems in accordance with various examples discussed herein.
Figure 5:
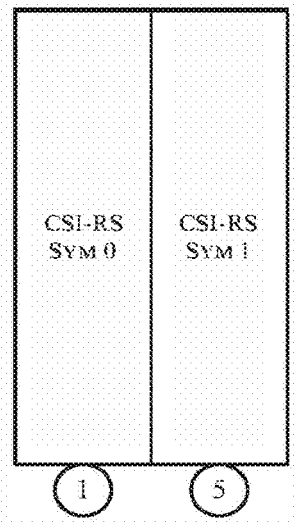

As illustrated in FIGS. 4-5, in another example the channel state indicator received strength (CSI-RS) signal may be used in configuring the UE. Referring to FIG. 4, at operation 410 a UE may report a BRS-RP, which may be in response to a periodic BRS or an aperiodic BRS from the eNB. The UE receives the BRS and measures one or more signal strength parameters associated with the BRS, which is reported back to the eNB at operation 410.

At operation 415 the eNB transmits CSI process configuration to the UE. At operation 420 the eNB transmits one or more CSI. A UE with multiple antenna panels may detect the CSI for 8 TX beams within two OFDM symbols. Up to two RX beams may be used. Each RX beam may be used to measure CSI for 4 TX beams. An example is shown in FIG. 5. RX beam 1 is used to measure CSI for CSI-RS symbol 0 and RX beam 5 is used for CSI-RS symbol 1 receiving. At operation 425 the UE may transmit uplink control information to the UE.

To support the RX beamforming, the eNB may use highly correlated beams within one CSI-RS symbol. The 8 transmit beams may be divided into 2 groups, and the group index for each symbol may be obtained by UE.

In another example, the TX beams group index may be transmitted via RRC signaling or downlink assignment. Each CSI-RS in a symbol may be considered as a CSI process, and the TX beam index in each CSI process may be configured via RRC signaling. In the downlink assignment, an N bit indicator for the CSI process index may be used. Given there are maximum 8 CSI processes, an example for the 4-bit CSI process index indicator may be as Table 1.

TABLE I

| | Content for CSI Indicator | |
|---|---|---|
| CSI Process Indicator | CSI Process Index for CSI-RS Symbol 0 | CSI Process Index for CSI-RS Symbol 1 |
| 0 | 0 | 1 |
| 1 | 2 | 3 |
| 2 | 4 | 5 |
| 3 | 6 | 7 |

In some examples different TX beams may be applied to the different EPDCCH sets. Then PDSCH and different RX beams may be used to decode PDSCH and EPDCCH, so the PDSCH and EPDCCH may need to be located at different subframes. The system may be in a cross-subframe and cross-beam scheduling way.

In another example, the TX beam index or TX beams group index for PDSCH may be indicated in a downlink assignment. The TX beam index may be obtained based on a BRS ID. The subframe offset between EPDCCH and PDSCH may be indicated in downlink assignment or configured as a fixed value in the system.

In another example, the TX beam index for PDSCH may not be indicated in each scheduling DCI, and it may not change until an inter-beam handover procedure is done, by which the eNodeB may configure a new TX beam index for the UE via RRC signaling or a contention free PRACH procedure.

Figure 6:
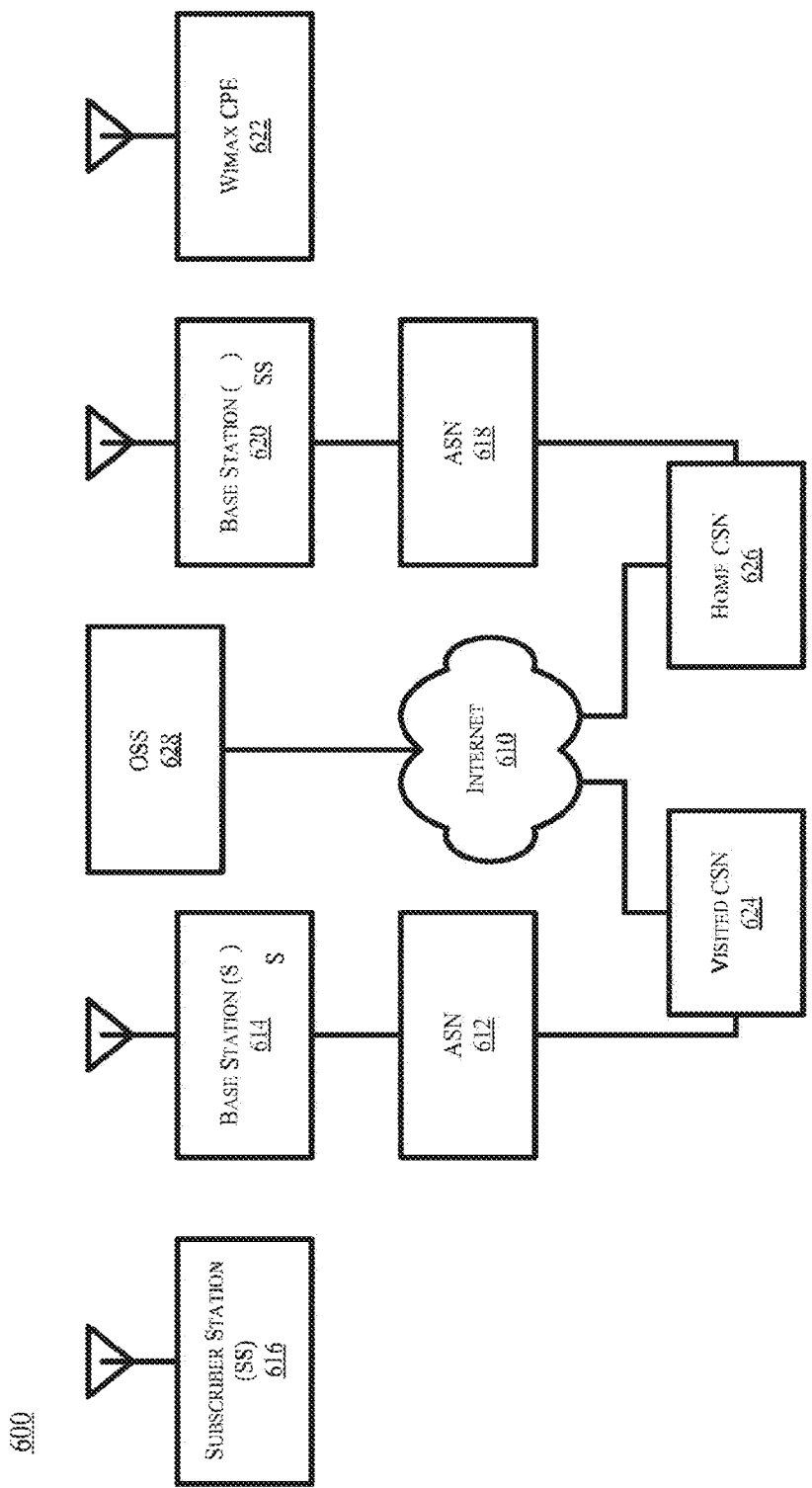
FIG. 6 is a schematic, block diagram illustration of a wireless network in accordance with one or more exemplary embodiments disclosed herein.

FIG. 6 is a schematic, block diagram illustration of a wireless network 600 in accordance with one or more exemplary embodiments disclosed herein. One or more of the elements of wireless network 600 may be capable of implementing methods to identify victims and aggressors according to the subject matter disclosed herein. As shown in FIG. 6, network 600 may be an Internet-Protocol-type (IP-type) network comprising an Internet-type network 610, or the like, that is capable of supporting mobile wireless access and/or fixed wireless access to Internet 610.

In one or more examples, network 600 may operate in compliance with a Worldwide Interoperability for Microwave Access (WiMAX) standard or future generations of WiMAX, and in one particular example may be in compliance with an Institute for Electrical and Electronics Engineers 802.16-based standard (for example, IEEE 802.16e), or an IEEE 802.11-based standard (for example, IEEE 802.11 a/b/g/n standard), and so on. In one or more alternative examples, network 600 may be in compliance with a 3rd Generation Partnership Project Long Term Evolution (3GPP LTE), a 3GPP2 Air Interface Evolution (3GPP2 AIE)

standard and/or a 3GPP LTE-Advanced standard. In general, network 600 may comprise any type of orthogonal-frequency-division-multiple-access-based (OFDMA-based) wireless network, for example, a WiMAX compliant network, a Wi-Fi Alliance Compliant Network, a digital subscriber-line-type (DSL-type) network, an asymmetric-digital-subscriber-line-type (ADSL-type) network, an Ultra-Wideband (UWB) compliant network, a Wireless Universal Serial Bus (USB) compliant network, a 4th Generation (4G) type network, and so on, and the scope of the claimed subject matter is not limited in these respects.

As an example of mobile wireless access, access service network (ASN) 612 is capable of coupling with base station (BS) 614 to provide wireless communication between subscriber station (SS) 616 (also referred to herein as a wireless terminal) and Internet 610. In one example, subscriber station 616 may comprise a mobile-type device or information-handling system capable of wirelessly communicating via network 600, for example, a notebook-type computer, a cellular telephone, a personal digital assistant, an M2M-type device, or the like. In another example, subscriber station is capable of providing an uplink-transmit-power control technique that reduces interference experienced at other wireless devices according to the subject matter disclosed herein. ASN 612 may implement profiles that are capable of defining the mapping of network functions to one or more physical entities on network 600. Base station 614 may comprise radio equipment to provide radio-frequency (RF) communication with subscriber station 616, and may comprise, for example, the physical layer (PHY) and media access control (MAC) layer equipment in compliance with an IEEE 802.16e-type standard. Base station 614 may further comprise an IP backplane to couple to Internet 610 via ASN 612, although the scope of the claimed subject matter is not limited in these respects.

Network 600 may further comprise a visited connectivity service network (CSN) 624 capable of providing one or more network functions including, but not limited to, proxy and/or relay type functions, for example, authentication, authorization and accounting (AAA) functions, dynamic host configuration protocol (DHCP) functions, or domain-name service controls or the like, domain gateways, such as public switched telephone network (PSTN) gateways or Voice over Internet Protocol (VoIP) gateways, and/or Internet-Protocol-type (IP-type) server functions, or the like. These are, however, merely example of the types of functions that are capable of being provided by visited CSN or home CSN 626, and the scope of the claimed subject matter is not limited in these respects.

Visited CSN 624 may be referred to as a visited CSN in the case, for example, in which visited CSN 624 is not part of the regular service provider of subscriber station 616, for example, in which subscriber station 616 is roaming away from its home CSN, such as home CSN 626, or, for example, in which network 600 is part of the regular service provider of subscriber station, but in which network 600 may be in another location or state that is not the main or home location of subscriber station 616.

In a fixed wireless arrangement, WiMAX-type customer premises equipment (CPE) 622 may be located in a home or business to provide home or business customer broadband access to Internet 610 via base station 620, ASN 618, and home CSN 626 in a manner similar to access by subscriber station 616 via base station 614, ASN 612, and visited CSN 624, a difference being that WiMAX CPE 622 is generally disposed in a stationary location, although it may be moved to different locations as needed, whereas subscriber station may be utilized at one or more locations if subscriber station 616 is within range of base station 614 for example.

It should be noted that CPE 622 need not necessarily comprise a WiMAX-type terminal, and may comprise other types of terminals or devices compliant with one or more standards or protocols, for example, as discussed herein, and in general may comprise a fixed or a mobile device. Moreover, in one exemplary embodiment, CPE 622 is capable of providing an uplink-transmit-power control technique that reduces interference experienced at other wireless devices according to the subject matter disclosed herein.

In accordance with one or more examples, operation support system (OSS) 628 may be part of network 600 to provide management functions for network 600 and to provide interfaces between functional entities of network 600. Network 600 of FIG. 6 is merely one type of wireless network showing a certain number of the components of network 600; however, the scope of the claimed subject matter is not limited in these respects.

Figure 7:
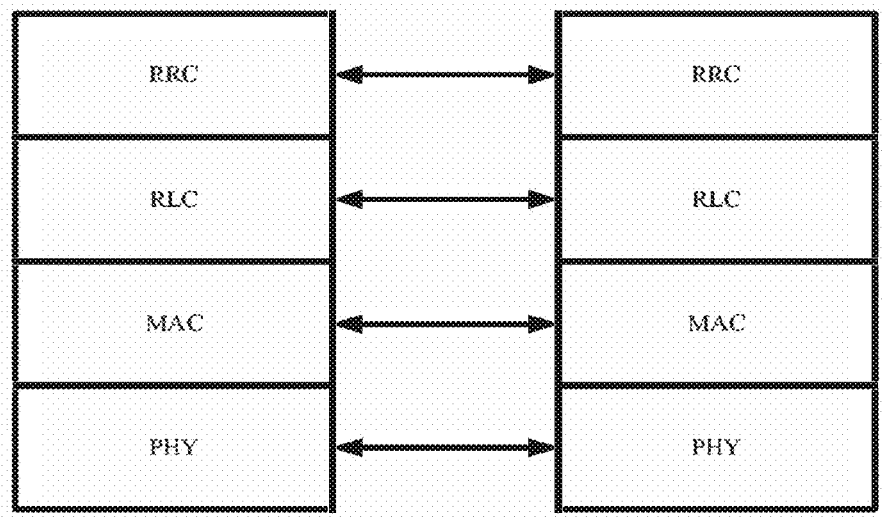
FIGS. 7 and 8 are schematic, block diagram illustrations, respectively, of radio interface protocol structures between a UE and an eNodeB based on a 3GPP-type radio access network standard in accordance with one or more exemplary embodiments disclosed herein.
Figure 8:
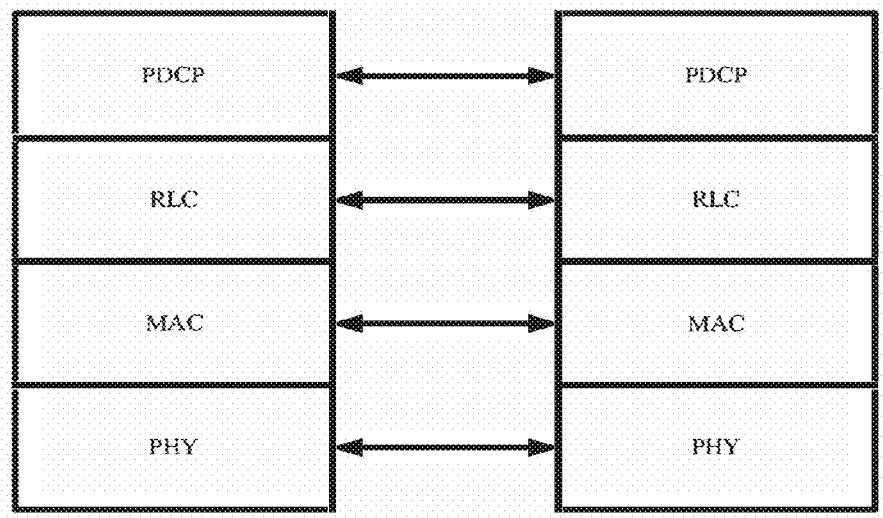
Figure 10:
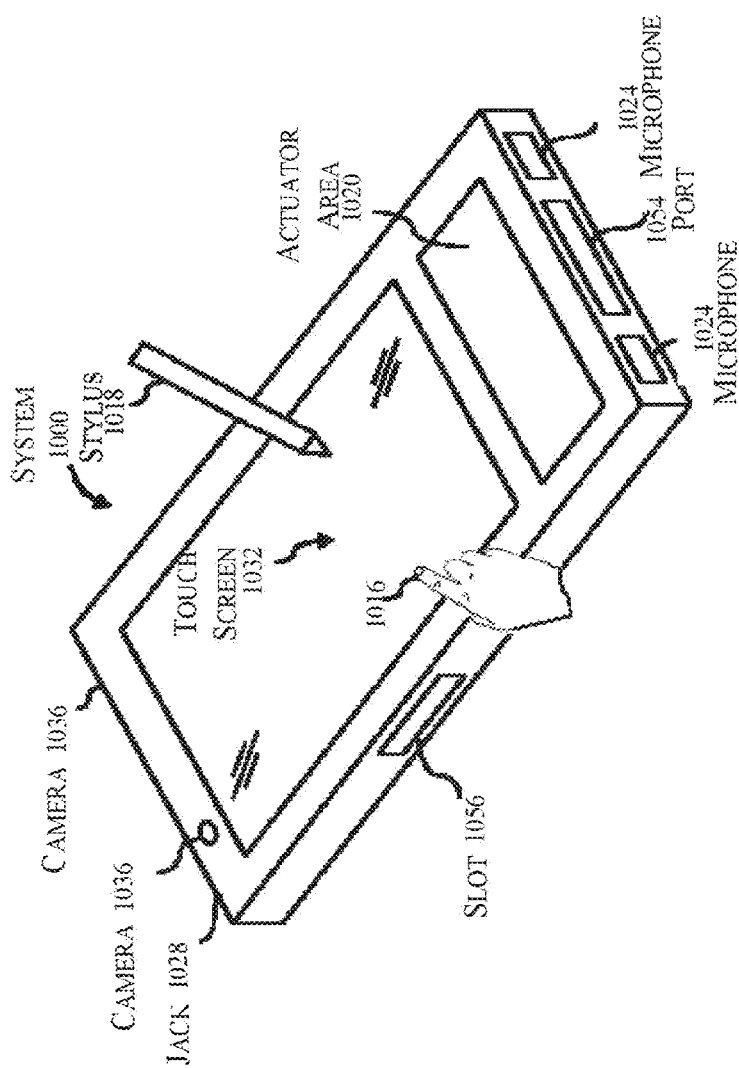
FIG. 10 is an isometric view of an exemplary embodiment of an information-handling system that optionally may include a touch screen in accordance with one or more embodiments disclosed herein.

FIGS. 7 and 8 respectively depict exemplary radio interface protocol structures between a UE and an eNodeB that are based on a 3GPP-type radio access network standard and that is capable of providing an uplink-transmit-power control technique that reduces interference experienced at other wireless devices according to the subject matter disclosed herein. More specifically, FIG. 7 depicts individual layers of a radio protocol control plane and FIG. 10 depicts individual layers of a radio protocol user plane. The protocol layers of FIGS. 7 and 8 can be classified into an L1 layer (first layer), an L2 layer (second layer) and an L3 layer (third layer) on the basis of the lower three layers of the OSI reference model widely known in communication systems.

The physical (PHY) layer, which is the first layer (L1), provides an information transfer service to an upper layer using a physical channel. The physical layer is connected to a Medium Access Control (MAC) layer, which is located above the physical layer, through a transport channel. Data is transferred between the MAC layer and the PHY layer through the transport channel. A transport channel is classified into a dedicated transport channel and a common transport channel according to whether or not the channel is shared. Data transfer between different physical layers, specifically between the respective physical layers of a transmitter and a receiver is performed through the physical channel.

A variety of layers exist in the second layer (L2 layer). For example, the MAC layer maps various logical channels to various transport channels, and performs logical-channel multiplexing for mapping various logical channels to one transport channel. The MAC layer is connected to the Radio Link Control (RLC) layer serving as an upper layer through a logical channel. The logical channel can be classified into a control channel for transmitting information of a control plane and a traffic channel for transmitting information of a user plane according to categories of transmission information.

The RLC layer of the second layer (L2) performs segmentation and concatenation on data received from an upper layer, and adjusts the size of data to be suitable for a lower layer transmitting data to a radio interval. In order to guarantee various Qualities of Service (QoSs) requested by respective radio bearers (RBs), three operation modes, i.e., a Transparent Mode (TM), an Unacknowledged Mode (UM), and an Acknowledged Mode (AM), are provided. Specifically, an AM RLC performs a retransmission function using an Automatic Repeat and Request (ARQ) function so as to implement reliable data transmission.

A Packet Data Convergence Protocol (PDCP) layer of the second layer (L2) performs a header compression function to reduce the size of an IP packet header having relatively large and unnecessary control information in order to efficiently transmit IP packets, such as IPv4 or IPv6 packets, in a radio interval with a narrow bandwidth. As a result, only information required for a header part of data can be transmitted, so that transmission efficiency of the radio interval can be increased. In addition, in an LTE-based system, the PDCP layer performs a security function that includes a ciphering function for preventing a third party from eavesdropping on data and an integrity protection function for preventing a third party from handling data.

A Radio Resource Control (RRC) layer located at the top of the third layer (L3) is defined only in the control plane and is responsible for control of logical, transport, and physical channels in association with configuration, re-configuration and release of Radio Bearers (RBs). The RB is a logical path that the first and second layers (L1 and L2) provide for data communication between the UE and the UTRAN. Generally, Radio Bearer (RB) configuration means that a radio protocol layer needed for providing a specific service, and channel characteristics are defined and their detailed parameters and operation methods are configured. The Radio Bearer (RB) is classified into a Signaling RB (SRB) and a Data RB (DRB). The SRB is used as a transmission passage of RRC messages in the C plane, and the DRB is used as a transmission passage of user data in the U plane.

A downlink transport channel for transmitting data from the network to the UE may be classified into a Broadcast Channel (BCH) for transmitting system information and a downlink Shared Channel (SCH) for transmitting user traffic or control messages. Traffic or control messages of a downlink multicast or broadcast service may be transmitted through a downlink SCH and may also be transmitted through a downlink multicast channel (MCH). Uplink transport channels for transmission of data from the UE to the network include a Random Access Channel (RACH) for transmission of initial control messages and an uplink SCH for transmission of user traffic or control messages.

Downlink physical channels for transmitting information transferred to a downlink transport channel to a radio interval between the UE and the network are classified into a Physical Broadcast Channel (PBCH) for transmitting BCH information, a Physical Multicast Channel (PMCH) for transmitting MCH information, a Physical Downlink Shared Channel (PDSCH) for transmitting downlink SCH information, and a Physical Downlink Control Channel (PDCCH) (also called a DL L1/L2 control channel) for transmitting control information, such as DL/UL Scheduling Grant information, received from first and second layers (L1 and L2). In the meantime, uplink physical channels for transmitting information transferred to an uplink transport channel to a radio interval between the UE and the network are classified into a Physical Uplink Shared Channel (PUSCH) for transmitting uplink SCH information, a Physical Random Access Channel for transmitting RACH information, and a Physical Uplink Control Channel (PUCCH) for transmitting control information, such as Hybrid Automatic Repeat Request (HARQ) ACK or NACK Scheduling Request (SR) and Channel Quality Indicator (CQI) report information, received from first and second layers (L1 and L2).

Figure 9:
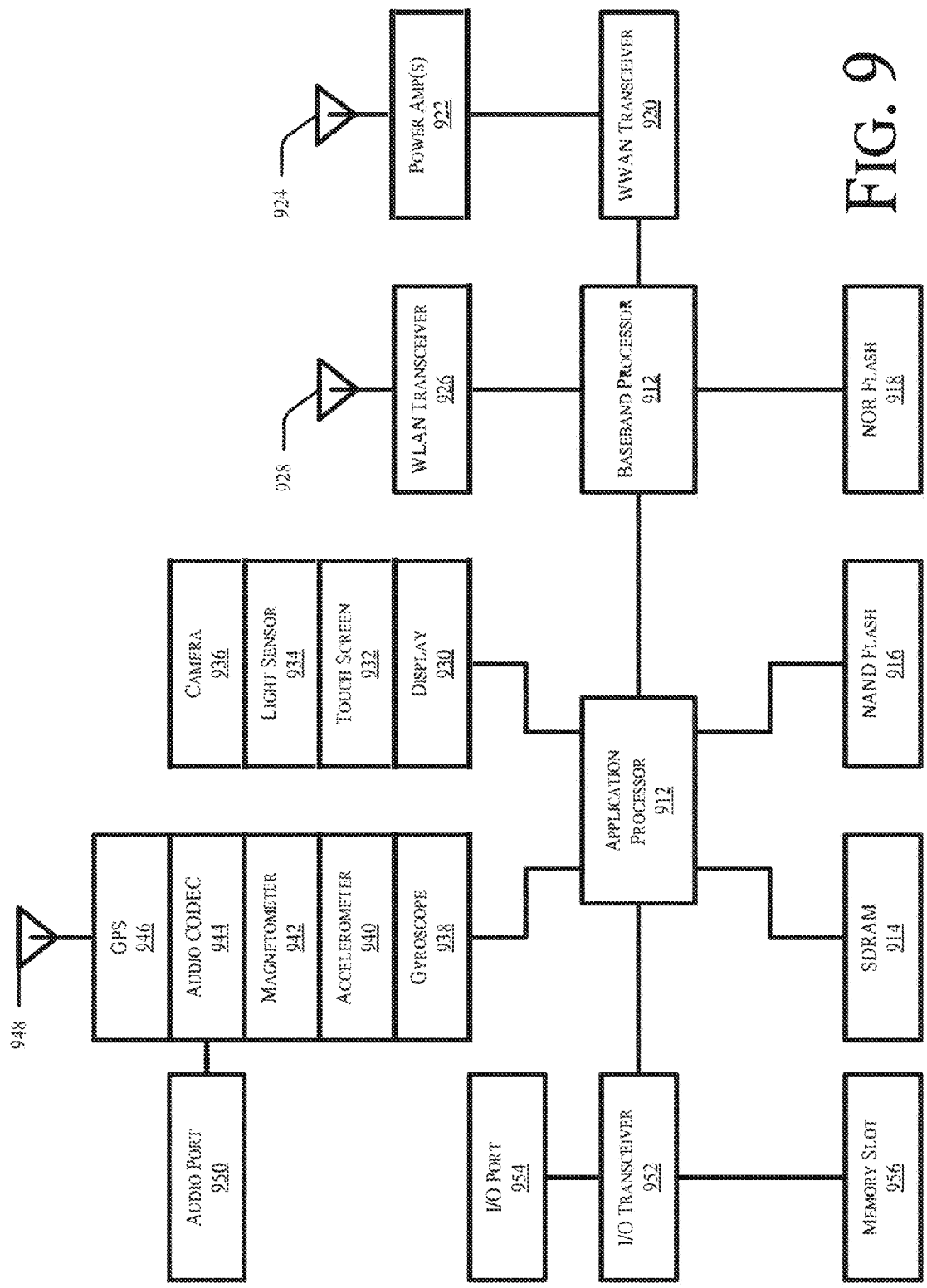
FIG. 9 is a schematic, block diagram illustration of an information-handling system in accordance with one or more exemplary embodiments disclosed herein.

FIG. 9 depicts an exemplary functional block diagram of an information-handling system 900 that is capable of implementing methods to identify victims and aggressors according to the subject matter disclosed herein. Information handling system 900 of FIG. 9 may tangibly embody one or more of any of the exemplary devices, exemplary network elements and/or functional entities of the network as shown in and described herein. In one example, information-handling system 900 may represent the components of a UE 91 or eNB 90, and/or a WLAN access point 120, with greater or fewer components depending on the hardware specifications of the particular device or network element. In another example, information-handling system may provide M2M-type device capability. In yet another exemplary embodiment, information-handling system 900 is capable of providing an uplink-transmit-power control technique that reduces interference experienced at other wireless devices according to the subject matter disclosed herein. Although information-handling system 900 represents one example of several types of computing platforms, information-handling system 900 may include more or fewer elements and/or different arrangements of elements than shown in FIG. 9, and the scope of the claimed subject matter is not limited in these respects.

In one or more examples, information-handling system 900 may comprise one or more applications processor 910 and a baseband processor 912. Applications processor 910 may be utilized as a general purpose processor to run applications and the various subsystems for information handling system 900, and to capable of providing an uplink-transmit-power control technique that reduces interference experienced at other wireless devices according to the subject matter disclosed herein. Applications processor 910 may include a single core or alternatively may include multiple processing cores wherein one or more of the cores may comprise a digital signal processor or digital signal processing core. Furthermore, applications processor 910 may include a graphics processor or coprocessor disposed on the same chip, or alternatively a graphics processor coupled to applications processor 910 may comprise a separate, discrete graphics chip. Applications processor 910 may include on-board memory, such as cache memory, and further may be coupled to external memory devices such as synchronous dynamic random access memory (SDRAM) 914 for storing and/or executing applications, such as capable of providing an uplink-transmit-power control technique that reduces interference experienced at other wireless devices according to the subject matter disclosed herein. During operation, and NAND flash 916 for storing applications and/or data even when information handling system 900 is powered off.

In one example, a list of candidate nodes may be stored in SDRAM 914 and/or NAND flash 916. Further, applications processor 910 may execute computer-readable instructions stored in SDRAM 914 and/or NAND flash 916 that result in an uplink-transmit-power control technique that reduces interference experienced at other wireless devices according to the subject matter disclosed herein.

In one example, baseband processor 912 may control the broadband radio functions for information-handling system 900. Baseband processor 912 may store code for controlling such broadband radio functions in a NOR flash 918. Baseband processor 912 controls a wireless wide area network (WWAN) transceiver 920 which is used for modulating and/or demodulating broadband network signals, for example, for communicating via a 3GPP LTE network or the like as discussed herein with respect to FIG. 9. The WWAN transceiver 920 couples to one or more power amplifiers 922 that are respectively coupled to one or more antennas 924 for sending and receiving radio-frequency signals via the WWAN broadband network. The baseband processor 912 also may control a wireless local area network (WLAN)

transceiver 926 coupled to one or more suitable antennas 928 and that may be capable of communicating via a Bluetooth-based standard, an IEEE 802.11-based standard, an IEEE 802.16-based standard, an IEEE 802.18-based wireless network standard, a 3GPP-based protocol wireless network, a Third Generation Partnership Project Long Term Evolution (3GPP LTE) based wireless network standard, a 3GPP2 Air Interface Evolution (3GPP2 AIE) based wireless network standard, a 3GPP-LTE-Advanced-based wireless network, a UMTS-based protocol wireless network, a CDMA2000-based protocol wireless network, a GSM-based protocol wireless network, a cellular-digital-packet-data-based (CDPD-based) protocol wireless network, a Mobitex-based protocol wireless network, a Near-Field-Communications-based (NFC-based) link, a WiGig-based network, a ZigBee-based network, or the like. It should be noted that these are merely exemplary implementations for applications processor 910 and baseband processor 912, and the scope of the claimed subject matter is not limited in these respects. For example, any one or more of SDRAM 914, NAND flash 916 and/or NOR flash 918 may comprise other types of memory technology, such as magnetic-based memory, chalcogenide-based memory, phase-change-based memory, optical-based memory, or ovonic-based memory, and the scope of the claimed subject matter is not limited in this respect.

In one or more embodiments, applications processor 910 may drive a display 930 for displaying various information or data, and may further receive touch input from a user via a touch screen 932, for example, via a finger or a stylus. In one exemplary embodiment, screen 932 display a menu and/or options to a user that are selectable via a finger and/or a stylus for entering information into information-handling system 900.

An ambient light sensor 934 may be utilized to detect an amount of ambient light in which information-handling system 900 is operating, for example, to control a brightness or contrast value for display 930 as a function of the intensity of ambient light detected by ambient light sensor 934. One or more cameras 936 may be utilized to capture images that are processed by applications processor 910 and/or at least temporarily stored in NAND flash 916. Furthermore, applications processor may be coupled to a gyroscope 938, accelerometer 940, magnetometer 942, audio coder/decoder (CODEC) 944, and/or global positioning system (GPS) controller 946 coupled to an appropriate GPS antenna 948, for detection of various environmental properties including location, movement, and/or orientation of information-handling system 900. Alternatively, controller 946 may comprise a Global Navigation Satellite System (GNSS) controller. Audio CODEC 944 may be coupled to one or more audio ports 950 to provide microphone input and speaker outputs either via internal devices and/or via external devices coupled to information-handling system via the audio ports 950, for example, via a headphone and microphone jack. In addition, applications processor 910 may couple to one or more input/output (I/O) transceivers 952 to couple to one or more I/O ports 954 such as a universal serial bus (USB) port, a high-definition multimedia interface (HDMI) port, a serial port, and so on. Furthermore, one or more of the I/O transceivers 952 may couple to one or more memory slots 956 for optional removable memory, such as secure digital (SD) card or a subscriber identity module (SIM) card, although the scope of the claimed subject matter is not limited in these respects.

FIG. 10 depicts an isometric view of an exemplary embodiment of the information-handling system of FIG. 9 that optionally may include a touch screen in accordance with one or more embodiments disclosed herein. FIG. 9 shows an example implementation of an information-handling system 1000 tangibly embodied as a cellular telephone, smartphone, smart-type device, or tablet-type device or the like, that is capable of implementing methods to identify victims and aggressors according to the subject matter disclosed herein. In one or more embodiments, the information-handling system a housing 1010 having a display 1030 that may include a touch screen 1032 for receiving tactile input control and commands via a finger 1016 of a user and/or a via stylus 1018 to control one or more applications processors 910. The housing 1010 may house one or more components of information-handling system 1000, for example, one or more applications processors 910, one or more of SDRAM 914, NAND flash 916, NOR flash 918, baseband processor 912, and/or WWAN transceiver 920. The information-handling system 1000 further may optionally include a physical actuator area 1020 which may comprise a keyboard or buttons for controlling information-handling system 1000 via one or more buttons or switches. The information-handling system 1000 may also include a memory port or slot 1056 for receiving non-volatile memory, such as flash memory, for example, in the form of a secure digital (SD) card or a subscriber identity module (SIM) card. Optionally, the information-handling system 1000 may further include one or more speakers and/or microphones 1024 and a connection port 1054 for connecting the information-handling system 1000 to another electronic device, dock, display, battery charger, and so on. Additionally, information-handling system 1000 may include a headphone or speaker jack 1028 and one or more cameras 1036 on one or more sides of the housing 1010. It should be noted that the information-handling system 1000 of FIG. 10 may include more or fewer elements than shown, in various arrangements, and the scope of the claimed subject matter is not limited in this respect.

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

Figure 11:
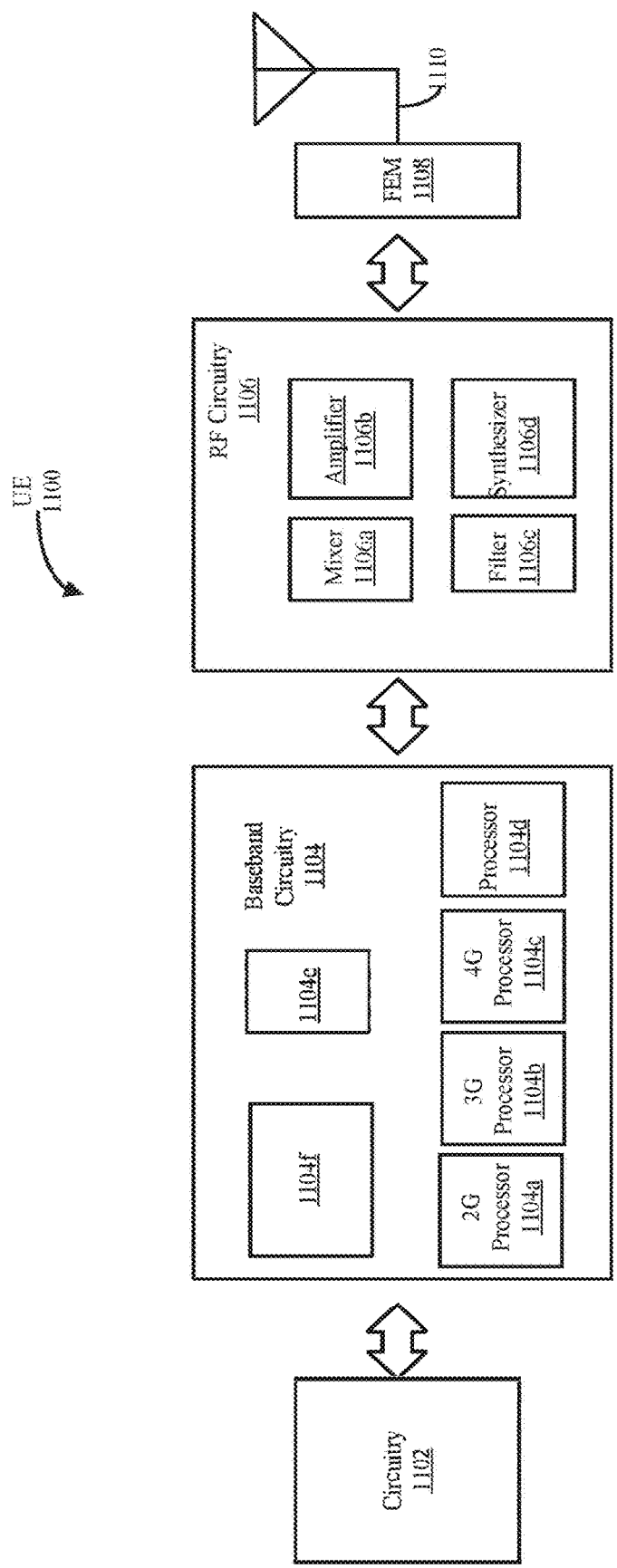
FIG. 11 is a schematic, block diagram illustration of components of a wireless device in accordance with one or more exemplary embodiments disclosed herein.

Embodiments described herein may be implemented into a system using any suitably configured hardware and/or software. FIG. 11 illustrates, for one embodiment, example components of a User Equipment (UE) device 1100. In some embodiments, the UE device 1100 may include application circuitry 1102, baseband circuitry 1104, Radio Frequency (RF) circuitry 1106, front-end module (FEM) circuitry 1108 and one or more antennas 1110, coupled together at least as shown.

The application circuitry 1102 may include one or more application processors. For example, the application circuitry 1102 may include circuitry such as, but not limited to, one or more single-core or multi-core processors. The processor(s) may include any combination of general-purpose processors and dedicated processors (e.g., graphics processors, application processors, etc.). The processors may be coupled with and/or may include memory/storage and may be configured to execute instructions stored in the memory/storage to enable various applications and/or operating systems to run on the system.

The baseband circuitry 1104 may include circuitry such as, but not limited to, one or more single-core or multi-core processors. The baseband circuitry 1104 may include one or more baseband processors and/or control logic to process baseband signals received from a receive signal path of the RF circuitry 1106 and to generate baseband signals for a transmit signal path of the RF circuitry 1106. Baseband processing circuitry 1104 may interface with the application circuitry 1102 for generation and processing of the baseband signals and for controlling operations of the RF circuitry 1106. For example, in some embodiments, the baseband circuitry 1104 may include a second generation (2G) baseband processor 1104a, third generation (3G) baseband processor 1104b, fourth generation (4G) baseband processor 1104c, and/or other baseband processor(s) 1104d for other existing generations, generations in development or to be developed in the future (e.g., fifth generation (5G), 6G, etc.). The baseband circuitry 1104 (e.g., one or more of baseband processors 1104a-d) may handle various radio control functions that enable communication with one or more radio networks via the RF circuitry 1106. The radio control functions may include, but are not limited to, signal modulation/demodulation, encoding/decoding, radio frequency shifting, etc. In some embodiments, modulation/demodulation circuitry of the baseband circuitry 1104 may include Fast-Fourier Transform (FFT), precoding, and/or constellation mapping/demapping functionality. In some embodiments, encoding/decoding circuitry of the baseband circuitry 1104 may include convolution, tail-biting convolution, turbo, Viterbi, and/or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 1104 may include elements of a protocol stack such as, for example, elements of an evolved universal terrestrial radio access network (EUTRAN) protocol including, for example, physical (PHY), media access control (MAC), radio link control (RLC), packet data convergence protocol (PDCP), and/or radio resource control (RRC) elements. A central processing unit (CPU) 1104e of the baseband circuitry 1104 may be configured to run elements of the protocol stack for signaling of the PHY, MAC, RLC, PDCP and/or RRC layers. In some embodiments, the baseband circuitry may include one or more audio digital signal processor(s) (DSP) 1104E The audio DSP(s) 1104f may be include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 1104 and the application circuitry 1102 may be implemented together such as, for example, on a system on a chip (SOC).

In some embodiments, the baseband circuitry 1104 may provide for communication compatible with one or more radio technologies. For example, in some embodiments, the baseband circuitry 1104 may support communication with an evolved universal terrestrial radio access network (EUTRAN) and/or other wireless metropolitan area networks (WMAN), a wireless local area network (WLAN), a wireless personal area network (WPAN). Embodiments in which the baseband circuitry 1104 is configured to support radio communications of more than one wireless protocol may be referred to as multi-mode baseband circuitry.

RF circuitry 1106 may enable communication with wireless networks using modulated electromagnetic radiation through a non-solid medium. In various embodiments, the RF circuitry 1106 may include switches, filters, amplifiers, etc. to facilitate the communication with the wireless network. RF circuitry 1106 may include a receive signal path which may include circuitry to down-convert RF signals received from the FEM circuitry 1108 and provide baseband signals to the baseband circuitry 1104. RF circuitry 1106 may also include a transmit signal path which may include circuitry to up-convert baseband signals provided by the baseband circuitry 1104 and provide RF output signals to the FEM circuitry 1108 for transmission.

In some embodiments, the RF circuitry 1106 may include a receive signal path and a transmit signal path. The receive signal path of the RF circuitry 1106 may include mixer circuitry 1106a, amplifier circuitry 1106b and filter circuitry 1106c. The transmit signal path of the RF circuitry 1106 may include filter circuitry 1106c and mixer circuitry 1106a. RF circuitry 1106 may also include synthesizer circuitry 1106d for synthesizing a frequency for use by the mixer circuitry 1106a of the receive signal path and the transmit signal path. In some embodiments, the mixer circuitry 1106a of the receive signal path may be configured to down-convert RF signals received from the FEM circuitry 1108 based on the synthesized frequency provided by synthesizer circuitry 1106d. The amplifier circuitry 1106b may be configured to amplify the down-converted signals and the filter circuitry 1106c may be a low-pass filter (LPF) or band-pass filter (BPF) configured to remove unwanted signals from the down-converted signals to generate output baseband signals. Output baseband signals may be provided to the baseband circuitry 1104 for further processing. In some embodiments, the output baseband signals may be zero-frequency baseband signals, although this is not a requirement. In some embodiments, mixer circuitry 1106a of the receive signal path may comprise passive mixers, although the scope of the embodiments is not limited in this respect.

In some embodiments, the mixer circuitry 1106a of the transmit signal path may be configured to up-convert input baseband signals based on the synthesized frequency provided by the synthesizer circuitry 1106d to generate RF output signals for the FEM circuitry 1108. The baseband signals may be provided by the baseband circuitry 1104 and may be filtered by filter circuitry 1106c. The filter circuitry 1106c may include a low-pass filter (LPF), although the scope of the embodiments is not limited in this respect.

In some embodiments, the mixer circuitry 1106a of the receive signal path and the mixer circuitry 1106a of the transmit signal path may include two or more mixers and may be arranged for quadrature downconversion and/or upconversion respectively. In some embodiments, the mixer circuitry 1106a of the receive signal path and the mixer circuitry 1106a of the transmit signal path may include two or more mixers and may be arranged for image rejection (e.g., Hartley image rejection). In some embodiments, the mixer circuitry 1106a of the receive signal path and the mixer circuitry 1106a may be arranged for direct downconversion and/or direct upconversion, respectively. In some embodiments, the mixer circuitry 1106a of the receive signal path and the mixer circuitry 1106a of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 1106 may include analog-to-digital converter (ADC) and digital-to-analog converter (DAC) circuitry and the baseband circuitry 1104 may include a digital baseband interface to communicate with the RF circuitry 1106.

In some dual-mode embodiments, a separate radio IC circuitry may be provided for processing signals for each spectrum, although the scope of the embodiments is not limited in this respect.

In some embodiments, the synthesizer circuitry 1106d may be a fractional-N synthesizer or a fractional N/N+1 synthesizer, although the scope of the embodiments is not limited in this respect as other types of frequency synthesizers may be suitable. For example, synthesizer circuitry 1106d may be a delta-sigma synthesizer, a frequency multiplier, or a synthesizer comprising a phase-locked loop with a frequency divider.

The synthesizer circuitry 1106d may be configured to synthesize an output frequency for use by the mixer circuitry 1106a of the RF circuitry 1106 based on a frequency input and a divider control input. In some embodiments, the synthesizer circuitry 1106d may be a fractional N/N+1 synthesizer.

In some embodiments, frequency input may be provided by a voltage controlled oscillator (V CO), although that is not a requirement. Divider control input may be provided by either the baseband circuitry 1104 or the applications processor 1102 depending on the desired output frequency. In some embodiments, a divider control input (e.g., N) may be determined from a look-up table based on a channel indicated by the applications processor 1102.

Synthesizer circuitry 1106d of the RF circuitry 1106 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 1106d may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 1106 may include an IQ/polar converter.

FEM circuitry 1108 may include a receive signal path which may include circuitry configured to operate on RF signals received from one or more antennas 1110, amplify the received signals and provide the amplified versions of the received signals to the RF circuitry 1106 for further processing. FEM circuitry 1108 may also include a transmit signal path which may include circuitry configured to amplify signals for transmission provided by the RF circuitry 1106 for transmission by one or more of the one or more antennas 1110.

In some embodiments, the FEM circuitry 1108 may include a TX/RX switch to switch between transmit mode and receive mode operation. The FEM circuitry may include a receive signal path and a transmit signal path. The receive signal path of the FEM circuitry may include a low-noise amplifier (LNA) to amplify received RF signals and provide the amplified received RF signals as an output (e.g., to the RF circuitry 1106). The transmit signal path of the FEM circuitry 1108 may include a power amplifier (PA) to amplify input RF signals (e.g., provided by RF circuitry 1106), and one or more filters to generate RF signals for subsequent transmission (e.g., by one or more of the one or more antennas 1110.

In some embodiments, the UE device 1100 may include additional elements such as, for example, memory/storage, display, camera, sensor, and/or input/output (I/O) interface.

The following pertains to further examples.

Example 1 is an apparatus of an evolved Node B (eNB) comprising circuitry to receive, from a user equipment (UE), a beamforming reference signal received power (BRS-RP) measurement, and in response to the BRS-RP measurement, configure a downlink (DL) transmit (Tx) beamforming and a receiving (Rx) beamforming process on the UE.

In Example 2, the subject matter of Example 1 can optionally include circuitry to determine a Tx beam index for a beamformed reference signal (BRS) as a function of a center subcarrier index and a symbol index.

In Example 3, the subject matter of any one of Examples 1-2 can optionally include an arrangement wherein at least one Tx beam index is reserved for downlink (DL) receiving on an omni-directional antenna.

In Example 4, the subject matter of any one of Examples 1-3 can optionally include circuitry to transmit a first enhanced physical downlink control channel (EPDCCH) to the UE in at least a first Tx beam and a second Tx beam.

In Example 5, the subject matter of any one of Examples 1-4 can optionally include an arrangement wherein the first Tx beam and the second Tx beam are highly correlated.

In Example 6, the subject matter of any one of Examples 1-5 can optionally include an 10 arrangement wherein the Tx beam index for the first EDPCCH and the second EDPCCH are transmitted via at least one of a radio resource control (RRC) signaling or a random access response (RAR).

In Example 7, the subject matter of any one of Examples 1-6 can optionally include circuitry to transmit a first channel state information reference signal (CSI-RS) and a second CSI-RS to the 15 UE.

In Example 8, the subject matter of any one of Examples 1-7 can optionally include an arrangement wherein the Tx beam index for the first CSI-RS and the second CSI-RS are transmitted via a radio resource control (RRC) signaling.

In Example 9, the subject matter of any one of Examples 1-8 can optionally include an arrangement wherein the Tx beam index for the first CSI-RS and the second CSI-RS are indicted via a downlink (DL) assignment.

In Example 10, the subject matter of any one of Examples 1-9 can optionally include circuitry to transmit a physical downlink shared channel (PDSCH) in a first subframe and a corresponding DL assignment in second subframe, separate from the first subframe.

In Example 11, the subject matter of any one of Examples 1-10 can optionally include an arrangement wherein the PDSCH is transmitted after the DL assignment is transmitted and is separated by a delay, wherein the delay is transmitted with the DL assignment.

In Example 12, the subject matter of any one of Examples 1-11 can optionally include an arrangement wherein the DL assignment comprises an indicator for the Tx beam index.

In Example 13, the subject matter of any one of Examples 1-12 can optionally include an arrangement wherein the Tx beam index of the PDSCH remains fixed until an inter-beam handover procedure is completed.

In Example 14, the subject matter of any one of Examples 1-13 can optionally include an arrangement wherein the inter-beam handover procedure assigns a new Tx beam index via at least one of a RRC signaling or a non-contention based Physical Random Access Channel (PRACH) procedure.

Example 15 is an apparatus of a user equipment (UE) comprising circuitry to transmit, to an evolved node B (eNB), a beamforming reference signal received power (BRS-RP) measurement, and receive, from the eNB, instructions to configure a downlink (DL) transmit (Tx) beamforming and a receiving (Rx) beamforming process on the UE.

In Example 16, the subject matter of Example 15 can optionally include circuitry to transmit to the eNB a number of antenna panels in the UE.

In Example 17, the subject matter of any one of Examples 15-16 can optionally include an arrangement wherein the number of antenna panels in the UE may be transmitted by Radio Resource Control (RRC) signaling.

In Example 18, the subject matter of any one of Examples 15-17 can optionally include an arrangement wherein the number of antenna panels on the UE may be transmitted implicitly by transmitting a corresponding number of PRACH transmissions.

Example 19 is a machine-readable medium comprising instructions which, when executed by a processor in an apparatus of an evolved Node B (eNB), configure the processor to transmit, to an evolved node B (eNB), a beamforming reference signal received power (BRS-RP) measurement, and receive, from the eNB, instructions to configure a downlink (DL) transmit (Tx) beamforming and a receiving (Rx) beamforming process on the UE.

In Example 20, the subject matter of Example 19 can optionally include circuitry to transmit to the eNB a number of antenna panels in the UE.

In Example 21, the subject matter of any one of Examples 19-20 can optionally include an arrangement wherein the number of antenna panels in the UE may be transmitted by Radio Resource Control (RRC) signaling.

In Example 22, the subject matter of any one of Examples 19-21 can optionally include an arrangement wherein the number of antenna panels on the UE may be transmitted implicitly by transmitting a corresponding number of PRACH transmissions.

In various examples, the operations discussed herein may be implemented as hardware (e.g., circuitry), software, firmware, microcode, or combinations thereof, which may be provided as a computer program product, e.g., including a tangible (e.g., non-transitory) machine-readable or computer-readable medium having stored thereon instructions (or software procedures) used to program a computer to perform a process discussed herein. Also, the term "logic" may include, by way of example, software, hardware, or combinations of software and hardware. The machine-readable medium may include a storage device such as those discussed herein.

Reference in the specification to "one example" or "an example" means that a particular feature, structure, or characteristic described in connection with the example may be included in at least an implementation. The appearances of the phrase "in one example" in various places in the specification may or may not be all referring to the same example.

Also, in the description and claims, the terms "coupled" and "connected," along with their derivatives, may be used. In some examples, "connected" may be used to indicate that two or more elements are in direct physical or electrical contact with each other. "Coupled" may mean that two or more elements are in direct physical or electrical contact. However, "coupled" may also mean that two or more elements may not be in direct contact with each other, but may still cooperate or interact with each other.

Thus, although examples have been described in language specific to structural features and/or methodological acts, it is to be understood that claimed subject matter may not be limited to the specific features or acts described. Rather, the specific features and acts are disclosed as sample forms of implementing the claimed subject matter.

What is claimed is:

1. A method of operating a base station, the method comprising:
    transmitting a plurality of beamformed reference signals with a respective plurality of transmit beams;
    receiving, from a user equipment (UE), a report that identifies a first beamformed reference signal of the plurality of beamformed reference signals, the first beamformed reference signal transmitted on a first transmit beam of the plurality of transmit beams;
    transmitting a first control channel transmission to indicate a transmit beam update; and
    transmitting a second control channel transmission with the first transmit beam.

2. The method of claim 1, wherein the first control channel transmission comprises beam configuration information.

3. The method of claim 1, wherein the report includes a beamformed reference signal-receive power (BRS-RP) measurement.

4. The method of claim 1, wherein the second control channel transmission is a first enhanced physical downlink control channel (EPDCCH) set and the method further comprises: transmitting a second EPDCCH set with a second transmit beam.

5. The method of claim 1, further comprising:
    receiving, from the UE, an indicator of a number of antenna panels operational on the UE.

6. The method of claim 5, wherein the indicator is in a radio resource control message.

7. The method of claim 5, wherein the indicator is based on a number of physical random access channel (PRACH) transmissions.

8. The method of claim 1, wherein the first beamformed reference signal is a periodic channel state information-reference signal (CSI-RS).

9. The method of claim 1, wherein the first control channel transmission is to include an uplink grant.

10. An apparatus of a base station, the apparatus comprising:
    transmit circuitry;
    receive circuitry; and
    processing circuitry, coupled with the transmit circuitry, the processing circuitry to:

transmit, via the transmit circuitry, a plurality of reference signals with a respective plurality of transmit beams;
receive, from a user equipment (UE) via the receive circuitry, a report that identifies a first reference signal of the plurality of reference signals, the first reference signal transmitted by a first transmit beam of the plurality of transmit beams;
transmit, via the transmit circuitry, a first control channel transmission to indicate a beam update; and
transmit, via the transmit circuitry, a second control channel transmission with the first transmit beam.

11. The apparatus of claim 10, wherein the report includes a beamformed reference signal-receive power (BRS-RP) measurement.

12. The apparatus of claim 10, wherein the second control channel transmission is a first enhanced physical downlink control channel (EPDCCH) set and the processing circuitry is further to: transmit a second EPDCCH set with a second transmit beam.

13. The apparatus of claim 10, wherein the processing circuitry is further to:
receive, from the UE via the receive circuitry, an indicator of a number of antenna panels operational on the UE.

14. The apparatus of claim 13, wherein the indicator is in a radio resource control message or is based on a number of physical random access channel (PRACH) transmissions.

15. The apparatus of claim 10, wherein the first reference signal is a periodic channel state information-reference signal (CSI-RS).

16. The apparatus of claim 10, wherein the first control channel transmission is to include an uplink grant.

17. One or more non-transitory, computer-readable media (NTCRM) having instructions that, when executed by one or more processors, cause a user equipment (UE) to:
measure a plurality of reference signals transmitted by a respective plurality of transmit beams;
select, based on measurements of the plurality of reference signals, a first reference signal from the plurality of reference signals, the first reference signal transmitted by a first transmit beam of the plurality of transmit beams;
transmit a report to a base station to identify the first reference signal;
receive, from the base station, a first control channel transmission to indicate a transmit beam update; and
receive a second control channel transmission transmitted by the first transmit beam.

18. The one or more NTCRM of claim 17, wherein the first control channel transmission comprises beam configuration information and the UE is to receive the second control channel transmission based on the beam configuration information.

19. The one or more NTCRM of claim 17, wherein the report includes a beamformed reference signal-receive power (BRS-RP) measurement.

20. The one or more NTCRM of claim 17, wherein the instructions, when executed, further cause the UE to:
transmit, to the base station, an indicator of a number of antenna panels operational on the UE.

21. The one or more NTCRM of claim 20, wherein the indicator is in a radio resource control message or is based on a number of physical random access channel (PRACH) transmissions.

* * * * *